US005869557A

United States Patent [19]

Landru et al.

[11] Patent Number: 5,869,557

[45] Date of Patent: Feb. 9, 1999

[54] MOLDABLE AND PIGMENTABLE HEAT-CURABLE COMPOSITIONS CAPABLE OF BEING USED FOR OBTAINING MOLDED ARTICLES WITH ZERO SHRINKAGE OR SMALL EXPANSION

[75] Inventors: Lionel Landru, Eleu Dit Lauwette; Florent Raviola, Vaureal, both of France

[73] Assignee: Atohaas Holding C.V., Pays-Bas, France

[21] Appl. No.: 748,794

[22] Filed: Nov. 14, 1996

Related U.S. Application Data

[63] Continuation-in-part of Ser. No. 671,763, Jun. 28, 1996, abandoned.

[30] Foreign Application Priority Data

Jun. 30, 1995 [FR] France .................................. 95 07900

[51] Int. Cl.[6] ............................... C08K 5/04; C08K 3/26

[52] U.S. Cl. .......................... 524/399; 524/400; 524/424; 524/425; 524/430; 524/444; 524/494; 524/522; 428/480

[58] Field of Search ............................ 428/480; 524/399, 524/400, 424, 425, 430, 444, 494, 522

[56] References Cited

FOREIGN PATENT DOCUMENTS

| | | |
|---|---|---|
| 0 454 517 | 10/1991 | European Pat. Off. . |
| 2021415 | 7/1970 | France . |
| 1 953 062 | 5/1970 | Germany . |
| 61-57644 | 3/1986 | Japan . |
| 63-69812 | 3/1988 | Japan . |
| 4-209651 | 12/1990 | Japan . |
| 6-25539 | 2/1994 | Japan . |

OTHER PUBLICATIONS

Matériaux, Polymères Acryliques, pp. 224–231.
Abreviations.
Polymerisation en Suspension.

*Primary Examiner*—Kriellion S. Morgan
*Attorney, Agent, or Firm*—Millen, White, Zelano, & Branigan, P.C.

[57] ABSTRACT

Moldable and pigmentable heat-curable compositions which can be employed for forming molded articles with zero or practically zero shrinkage (low profile type) or a small expansion include a heat-curable resin, a catalyst, a (meth) acrylic polymer in powder form with a dimension smaller than 150 μm, at least one inorganic filler and, optionally, reinforcing fibers and organic or inorganic pigments.

27 Claims, No Drawings

MOLDABLE AND PIGMENTABLE HEAT-CURABLE COMPOSITIONS CAPABLE OF BEING USED FOR OBTAINING MOLDED ARTICLES WITH ZERO SHRINKAGE OR SMALL EXPANSION

CROSS-REFERENCE TO RELATED APPLICATION

This application is a continuation-in-part application of Ser. No. 081/671,763 abandoned, filed Jun. 28, 1996, which is hereby incorporated by reference.

BACKGROUND OF THE INVENTION

The invention relates to moldable heat-curable compositions, based especially on unsaturated polyester resin, for obtaining molded articles with a practically zero final shrinkage (generally called "low profile"-shrinkage of approximately between 0 and 0.05%) or a slight expansion, that is to say an increase in size, for example, from +0.2% to +0.09%.

Conventional unsaturated polyester resins usually include an unsaturated polyester diluted in a monomer containing ethylenic (vinyl or acrylic) unsaturation in order to adjust the viscosity as a function of the intended application. This monomer serves as a solvent for the polyester and for the crosslinking agent. A shrinkage in volume is observed during the crosslinking (or curing) of the polyester and of the monomer. This shrinkage results in cracks, faults in appearance and distortion of the articles. Shrinkage-compensating agents are therefore added, which are generally thermoplastic substances. If introduced in the form of powder or diluted in styrene, these agents are of a polystyrene, polyethylene, polyvinyl chloride or polymethyl methacrylate nature, resulting in linear shrinkages, after molding, of 0.2% to 0.1% (low shrink) or else of polyvinyl acetate, saturated polyester or elastomer kind, resulting in shrinkages close to zero (low profile). Whether these shrinkage-compensating additives are or are not soluble in the resins before crosslinking, they produce a phase separation at the time of the crosslinking. The microdomains formed give rise to a vacuum volume compensating the shrinkage of the polyester.

Heat-curable compositions which have zero shrinkage and are prepared from shrinkage-compensating additives known hitherto are impossible to pigment homogeneously; in particular, whitish marbling effects. are observed. It is therefore not possible to obtain molded articles containing pigments or dyes distributed homogeneously in bulk. This presents a problem when it is desired to manufacture colored molded articles, for example in the field of household electrical appliances.

Moldable heat-curable compositions also find an application in fields in which it is desired to obtain molded articles with a perfectly smooth surface which can be coated, for example, with a layer of paint, varnish or with a metallic substance: this is the case, in particular, with motor vehicle components, for example components for the bodywork and reflectors for lighting devices.

Bodywork components for motor vehicles are manufactured by molding, for example compression or injection molding, of heat-curable materials of the BMC (Bulk Molding Compound) type or of the SMC (Sheet Molding Compound) type including chiefly an unsaturated polyester resin, inorganic fillers and reinforcing fibers and at least one shrinkage-compensating agent. This agent is particularly important in the case of the BMCs or the SMCs intended to form bodywork components, because in some cases it is necessary to obtain zero or practically zero shrinkage (low profile) and, in other cases, a slight expansion in order to meet the requirements of class A of the motor vehicle sector (for example obtaining a perfectly smooth surface without shrinkage cavities).

Molding components intended for motor vehicles, for example those intended for the bodywork or components of the engine compartment must be capable of being painted. Painting of components made of polyester generally requires the deposition of a bonding coat (also called a primer coat) which promotes the adhesion of the coats of paint and improves the surface quality before they are applied. In the case of paints applied, for example, by electrostatic gun-spraying a conductive coat must be deposited beforehand.

To avoid this pretreatment, thought has been given to introducing conductive pigments into the heat-curable mixture. However, as already indicated, with compositions containing shrinkage-compensating agents such as those employed hitherto to obtain shrinkage of the low-profile type or a slight expansion, obtaining a homogeneous pigmentation is difficult and, in the case of a molded article, this results in a surface quality which is not suited for the deposition of a smooth and uniform coat of paint by electrostatic gun-spraying.

Heat-curable materials can also be used for the manufacture of (paraboloid) reflectors for lighting devices, for example for motor vehicles. The reflector must have a reflective surface of very good quality. For this purpose the concave inner surface of the reflector is covered with a thin coat of aluminum. Before the deposition of this coat (aluminum coating), the molded articles are subjected to a preliminary treatment, for example the deposition of a varnish, intended to impart perfect surface quality to the article and to promote the adhesion of the aluminum coating. Another possible treatment is to make the surface antistatic and to perform a deposition of powder at elevated temperature, to obtain a film which promotes the adhesion of the aluminum coating.

These treatments are costly and it would naturally be desirable, for obvious reasons of economy, to make it possible to eliminate the pretreatments of the articles molded from BMC or SMC heat-curable materials, regardless of whether this is the treatment before the deposition of paint or else that before the coating with aluminum, and hence to obtain moulded articles whose surface quality allows the aluminum or paint to be deposited directly.

SUMMARY OF THE INVENTION

The subject of the invention is pigmentable heat-curable compositions making it possible to manufacture colored or colorless molded articles exhibiting a smooth surface which is free from defects, with a particularly high surface gloss and, in addition, with shrinkage of the low profile type (shrinkage of approximately 0 to 0.5%) or a slight expansion.

The moldable and pigmentable heat-curable compositions according to the invention include, by weight:

from 15 to 45% of heat-curable resin from 0.2 to 1 % of a catalyst from 3 to 15% of (meth)acrylic polymer in powder form with a dimension smaller than 150 μm from 3 to 60% of inorganic fillers from 0 to 5% of organic or inorganic pigments, up to 60% of reinforcing fibers.

The specific compositions according to the invention, based on heat-curable resin and (meth)acrylic polymer in powder form make it possible to manufacture objects which exhibit a homogeneous color in bulk (absence of marbling), owing to a good distribution of the pigments or dyes and a sufficient degree of surface quality, in the majority of cases, to allow the direct application of a coating for protection and/or decoration or with a specific function (for example, reflection of light).

Such molded articles, with remarkable characteristics (smooth surface, gloss, homogeneous pigmentation), can be employed directly, for example, as household electrical appliance articles or furniture; they can also be employed in fields, such as motor vehicles, where a deposition of a substance (paint, varnish and the like) is necessary; in this case these depositions can be carried out without the usual pretreatments.

The heat-curable resin employed may be an unsaturated polyester resin which, as is well known, is a polyester resulting from the polycondensation of at least one unsaturated diacid or its anhydride and of at least one diol. Maleic acid and its anhydride and fumaric acid may be mentioned in particular. Small quantities of aromatic, cycloaliphatic or saturated aliphatic diacids or anhydrides may be employed to modify the mechanical and chemical properties of the final product. Ortho-Phthalic acid and its anhydride, isophthalic acid, adipic acid and tetrahydrophthalic anhydride may thus be employed. In the case of resins with improved resistance to fire it is possible to employ halogenated monomers like tetrabromo—or tetrachlorophthalic anhydride and hexachloroendomethylenetetrahydrophthalic acid. The main diols generally employed are ethylene glycol, propylene glycol, diethylene glycol, dipropylene glycol, neopentyl glycol or 1,3-butanediol.

As indicated above, the polyester is diluted in a monomer containing ethylenic unsaturation to obtain the resin with the viscosity which is necessary for the intended application. The monomer also serves to form the three-dimensional network during the crosslinking. Various monomers can be employed, chiefly acrylic or vinyl monomers like styrene, α-methylstyrene or vinyltoluene. The monomer most commonly employed is styrene.

The heat-curable resin employed may also be an epoxy vinyl ester resin which is an epoxy resin modified with an acid, in particular (meth)acrylic acid.

Catalysts are employed for bringing about the crosslinking of the polyester. They are generally organic peroxides which, depending on the temperature of the polymerization, may be di-tert-butyl peroxide, tert-butyl peroctoate, tert-butyl perbenzoate and benzoyl peroxide.

The (meth)acrylic polymer powders are advantageously made up of methyl methacrylate homopolymer or of copolymer of methyl methacrylate and of alkyl acrylate monomers (up to 20% by weight) in which the alkyl group has from 1 to 4 carbon atoms, or of vinyl monomers like styrene; the copolymer may be optionally crosslinked using conventional quantities of a difuctional monomer, for example, smaller than 1% by weight relative to the combined monomers.

The weight molecular mass of the meth(acrylic) polymer may vary within very wide limits, for example, from 100,000 up to the crosslinking. The (meth)acrylic polymer powder has a particle size which is smaller than 150 μm, preferably smaller than 100 μm, most preferably between 10 and 50 μm, but may also comprise particles with a diameter of less than 10 μor 1 μm. When the particles are too large in size (larger than 150 μm), the molded articles obtained exhibit surface defects (roughness or a studded appearance).

It is thought that the (meth)acrylic polymer powder acts as a shrinkage-compensating agent and that it also assists in the homogenization and the stabilization of all the components as a result of the increase in the viscosity, probably linked with the absorption of the monomer containing ethylenic unsaturation, like styrene, by the polymer powder, this being in the absence of any aging agent.

It is possible, nevertheless, to add a conventional aging agent, like an alkaline-earth oxide or hydroxide, for example, magnesium oxide, magnesia.

Finely divided (meth)acrylic polymer powders can be obtained by various processes, for example, by processes of polymerization in emulsion or in suspension, the latter being particularly preferred, or else by suitable dispersion processes in which, for example, a solid polymer is dissolved and is distributed in a nonsolvent, or else by grinding sheets, blocks, granules or beads (prills).

The composition according to the invention contains inorganic fillers, for example, calcium carbonate, alumina hydrate and the like. As is well known, these fillers impart properties such as rheological properties, fire resistance and chemical properties.

The composition may additionally contain up to 60% by weight of reinforcing fibers which are chosen especially from glass fibers between 3 and 25 mm in length, or carbon or aramid fibers such as those sold under the trade name Kevlar by DuPont de Nemours.

The composition may also contain other shrinkage-compensating additives, such as polystyrene, vinyl acetate polymer, copolymers of ethylene and of vinyl acetate and elastomers, to allow properties such as the flexural rupture strength to be adjusted. These additives generally represent 0 to 25% by weight of the composition.

It may also contain up to 4% by weight of mold-release agents, such as wax or metal stearates (for example, zinc or calcium stearate).

It may also contain up to 0.1% by weight of inhibitors such as hydroquinone, benzoquinone and parabenzoquinone to prevent the crosslinking of the polyester during synthesis or during the dilution with the ethylenic monomer.

The composition may also contain organic or inorganic pigments like animal black, iron oxide and the like.

A preferred composition according to the invention includes:

from 15 to 35% of heat-curable resin from 0.3 to 0.9% of catalyst from 35 to 56% of inorganic fillers from 0.1 to 5% of pigments from 7 to 25% of reinforcing fibres from 4 to 12% of (meth)acrylic polymer powder from 0 to 12% of antishrinkage agent from 0.5 to 4% of mould release agent.

This composition can be employed in particular for forming bodywork components by molding. It can also be used for manufacturing components of the engine compartment, particularly rocker covers.

A composition according to the invention, which can be employed especially for forming reflectors for lighting devices may include up to 10% by weight, and preferably from 5 to 10% of ballotini. The latter are used to improve the optical reflection.

The compositions according to the invention may also contain vegetable and/or synthetic fibers, for example, up to 45% by weight of the composition and, in particular, from 5 to 35%. In this case the composition may contain less of inorganic fillers, for example,from 3 to 20% by weight. As described in Application FR-A-2704863, these cellulose fibers make it possible to lower the density of the compositions, with the result that the components molded from these compositions are greatly reduced in weight when compared with equivalent components molded from conventional BMC compositions. These fibers may be of various origins, optionally from ground reclaimed articles, for example,cellulose-type fibers such as fibers of wood, cotton, sisal and the like, synthetic fibers (polypropylene, polyethylene terephthalate and the like) and of various lengths (a few microns to several millimeters). The articles obtained from these compositions can be recycled, as described in the above document.

Another preferred composition according to the invention thus includes, by weight:

from 15 to 35% of heat-curable resin from 0.3 to 0.9% of catalyst from 3 to 20% of inorganic fillers from 0.1 to 5% of pigments from 7 to 25% of reinforcing fibers from 4 to 12% of (meth)acrylic polymer powder from 0 to 18% of antishrinkage agent from 0.5 to 4% of mold release agent from 5 to 35% of cellulose fibers.

The molded, articles obtained from compositions according to the invention have shrinkage of the low profile type (shrinkage of approximately 0 to 0.05%) or a slight expansion of the order of +0.05% to +0.09%, which allows them to be employed especially for motor vehicle bodywork components.

The molded articles obtained from these compositions exhibit a very smooth surface which is free from defects, in particular from shrinkage cavities at protuberances and at reinforcing ribs.

The compositions according to the invention may contain pigments or dyes which are distributed homogeneously, and this results in molded articles which are perfectly pigmented in bulk. These components can therefore be employed for any article which must exhibit a homogeneous coloring in bulk, for example household electrical appliance articles.

As a result of the homogeneous distribution of the pigments in the compositions, according to the invention, it is possible, if these pigments are conductive, to obtain components which have a surface resistivity of between $10^3$ and $10^7$ Ω/log 10 (measured according to NFC standard 26215). With such a surface quality the components can be covered with paint by electrostatic gun-spraying without requiring the deposition of a conductive primer coat. For forming paraboloids (reflectors) for motor vehicle headlamps, for example, the deposition of the aluminum coat aluminum coating) may be performed directly on the molded component without the usual pretreatment being necessary.

The compositions for forming molded components which have a surface resistivity of between $10^3$ and $10^7$ Ω/log 10 include from 1% to 4% of conductive substances, especially carbon black.

The compositions according to the invention can be obtained by various processes.

The preferred process consists in employing two blenders.

A first, ribbon blender makes it possible to produce a homogeneous mixture of the solid components, for example, of the various inorganic fillers, of the glass fibers, of the (meth)acrylic polymer powder, of the other possible shrinkage-compensating additives and of the cellulose fibers.

A second, Z-blade blender is used in a first step for mixing the liquid components (resins, catalysts, dyes, etc.). It is subsequently used in the final operation which consists in impregnating the mixture of the solid components with the aid of the liquid mixture.

To give an example, the first, ribbon blender has a capacity of 1200 liters and is charged with 300 kg of solid materials. These materials are blended therein for a minute to a minute and a half at 42 revolutions/min.

The second, Z-blade blender also has a capacity of 1200 liters and also works at 42 revolutions/min. The blending of the liquid components lasts approximately 10 min and the impregnation of the solid components from 4 to 6 min, depending on the percentage of glass fibers.

The following examples illustrate the invention, no limitation being implied.

Examples 1 to 5: Compositions for Bodywork Components

BMC compositions are prepared by the process described above. The quantities of the various constituents of the composition are shown in Table 1. These quantities are given by weight.

The resin is a modified ortho-phthalic polyester resin (Resin 8532 sold by Reichold).

The (meth)acrylic polymer powder is made up of beads (prills) of crosslinked copolymer of methyl methacrylate and of ethyl acrylate, with a particle size of 10 to 50 μm, the preparation of which is described later.

The catalyst is a 50/50 mixture by weight of tert-butyl peroctoate and tert-butyl perbenzoate.

The conductive carbon black is the product PF 300, sold by Vulcan.

The shrinkage-compensating additive is made up of a mixture (approximately 50/50 by weight) of a copolymer of ethylene and of vinyl acetate sold under the trade name XF 504 and of an elastomer sold under the name XF 300 by Macstra.

The inorganic fillers employed are a 50/50 mixture by weight of alumina hydrate and calcium carbonate. The mould release agent is calcium stearate.

The compositions are compression-molded with heating at a temperature of the order of 145° C., at a pressure of approximately 80 bars, for a period of 10 s/mm.

The molded components obtained exhibit an expansion of between +0.05% and 0.09%.

The surface quality of the components is perfect and the appearance glossy. The colouring is uniform (homogeneous distribution of the carbon black).

The mechanical and-dielectric characteristics are measured on these molded components. The results are shown in Table 2.

Preparation of thebeads (prills) of crosslinked copolymer 825 g of an aqueous solution containing 2% by weight of polyvinyl alcohol (degree of hydrolysis, mol %, approximately 88; Mw=150,000) are introduced into a 2-liter jacketed glass reactor fitted with an anchor stirrer, a reflux condenser, a thermometer and a dip pipe for gas bubbling, and the air is then expelled by bubbling nitrogen through for 30 minutes at ambient temperature and while the stirrer is maintained at 50 revolutions per minute. The stirring is then raised to 500 revolutions per minute and a mixture, deoxygenated beforehand, of 268.7 g of methyl methacrylate, 13.5 g of ethyl acrylate and 2.75 g of ethylene glycol dimethacrylate is introduced. This solution contains 1.35 g of lauroyl peroxide in dissolved form. Stirring is continued for 60 minutes at ambient temperature and the internal temperature is then raised to 75° C. over a period of 75 minutes. The jacket temperature is controlled at 80° C. and the appearance of an internal temperature peak of up to approximately 85° C. is awaited within the period of 40 to 60 minutes. The jacket is maintained at 80° C. for 30 minutes and then cooling is applied and the beads (prills) are separated by filtration, washing and, finally, drying. The final product has a particle size, expressed as a mean value of the diameter, of approximately 25–30 μm.

Example 6: Control

A BMC composition is prepared from the constituents of Examples 1 to 5, with the difference that this composition does not contain any (meth)acrylic polymer beads (prills).

The surface appears marbled, resulting from poor dispersion of the pigment.

The surface quality is unsatisfactory (phenomenon of regions which are less smooth and less glossy).

The quantities of the constituents are shown in Table 1 and the characteristics in Table 2.

Example 7: Control

A composition including the same components as those of Examples 1 to 5 is prepared, with the exception of the (meth)acrylic polymer beads and of the carbon black.

The quantities of the constituents are shown in Table 1 and the characteristics in Table 2.

According to the results giben in Table 2 it may be concluded that the compositions according to the invention permit the manufacture of molded articles exhibiting especially a homogeneous surface resistivity over the whole surface, whereas with a control composition (Example 6) the poor dispersion of the conductive pigment is reflected in surface resistivity values which vary from $1.2\times10^4$ to $7\times10^5$ Ω/log 10, which prohibits any direct homogeneous deposition of paint.

It should be noted that, with a composition without carbon black,.the surface resistivity is $3\times10^{12}$ Ω/log 10. The very good insulation results in an impossibility of direct deposition of paint.

With the articles according to the invention it is possible to deposit a coat of paint directly by electrostatic gun-spraying without requiring the deposition of a primer coat.

Examples 8 to 10: Compositions for Motor Vehicle Headlamp Reflectors

Two BMC compositions according to the invention (Examples 8 and 9) and a control composition (Example 10) are prepared, which include the constituents shown in Table 3, the quantities of which are given by weight.

These compositions are employed for manufacturing reflectors by compression molding in the conditions shown in Examples 1 to 5.

The physical characteristics measured as in Examples 1 to 5 are given in Table 4.

TABLE 1

| | EXAMPLES | | | | | | |
|---|---|---|---|---|---|---|---|
| NATURE OF THE PRODUCTS | 1 | 2 | 3 | 4 | 5 | 6 control | 7 control |
| Polyester resin | 16 | 16 | 16 | 20 | 20 | 14.2 | 14.4 |
| Polymer beads | 4 | 6 | 7 | 9 | 11 | 0 | 0 |
| Peroxide catalyst | 0.3 | 0.3 | 0.5 | 0.56 | 0.40 | 0.35 | 0.35 |
| Conductive carbon black | 2 | 2.2 | 1.8 | 1.8 | 2 | 2 | 0 |
| Antishrinkage additive | 8 | 9 | 9.2 | 8 | 9.4 | 9.52 | 9.6 |
| Inorganic fillers | 55.7 | 50.5 | 46.5 | 41.64 | 36.20 | 48.93 | 50.65 |
| 6 and 13 mm glass fibers | 13 | 15 | 18 | 18 | 20 | 24 | 24 |
| Mold release agent | 1 | 1 | 1 | 1 | 1 | 1 | 1 |
| TOTAL | 100 | 100 | 100 | 100 | 100 | 100 | 100 |

TABLE 2

| | | EXAMPLES | | | | | | |
|---|---|---|---|---|---|---|---|---|
| CHARACTERISTICS | METHODS | 1 | 2 | 3 | 4 | 5 | 6 | 7 |
| Density | Pycnometer | 1.85 | 1.82 | 1.80 | 1.75 | 1.72 | 1.80 | 1.85 |
| Flexural strength (MPa) | NFT 51001 | 80 | 90 | 144 | 140 | 127 | 132 | 140 |
| Flexural modulus (MPa) | NFT 51001 | 9000 | 9400 | 12600 | 11900 | 12600 | 11400 | 11900 |
| Impact strength (kJ/m²) | NFT 51035 | 14 | 17 | 29 | 25 | 32 | 27 | 32 |
| Surface resistivity in Ω/log 10 | NFC 26215 | $2.8 \times 10^5$ | $9 \times 10^4$ | $2 \times 10^7$ | $10^7$ | $10^5$ | $1.2 \times 10^4$ to $7 \times 10^5$ | $3 \times 10^{12}$ |
| Dielectric strength in kV/mm at 90° C. | NFC 26225 | 5 | 5 | 7 | 7 | 6 | 6 | 15 |
| Expansion in % | DIN 53464 | +0.06 | +0.07 | +0.07 | +0.07 | +0.09 | +0.07 | +0.07 |

TABLE 3

| NATURE OF THE PRODUCTS | EXAMPLES 8 | 9 | 10 control |
|---|---|---|---|
| Polyester resin | 15 | 16 | 15 |
| Polymer beads | 8 | 7.4 | 0 |
| Peroxide catalyst | 0.4 | 0.6 | 0.35 |
| Conductive carbon black | 3 | 1.66 | 2 |
| Ballotini | 9 | 5 | 5 |
| 6 mm glass fibers | 13 | 7.7 | 14 |
| Antishrinkage additive | 0 | 8 | 8.92 |
| Mold release agent | 1.2 | 1 | 1 |
| Inorganic fillers | 50.4 | 52.64 | 54.73 |
| TOTAL | 100 | 100 | 100 |

TABLE 4

| CHARACTERISTICS | EXAMPLES 8 | 9 | 10 |
|---|---|---|---|
| Density | 1.82 | 1.9 | 1.85 |
| Flexural strength (MPa) | 90 | 80 | 80 |
| Flexural modulus (MPa) | 9000 | 8000 | 82000 |
| Impact strength kJ/m$^2$ | 15 | 10 | 12 |
| Surface resistivity Ω/log 10 | $4 \times 10^3$ | $1.2 \times 10^7$ | $10^3$ to $1.3 \times 10^4$ |
| Dielectric strength in kV/mm | 4 | 7 | 4 |
| Expansion in % | +0.05 | +0.07 | +0.07 |

With the compositions according to the invention, molded articles can be obtained on which it is possible to deposit a layer of aluminum (aluminum coating) directly (without the usual pretreatment), particularly when employing molds whose surface is perfectly polished (roughness lower than or equal to 0.05 μm).

The resistivity measured with the control product is not uniform over the whole surface, and this results in a non-uniform and inhomogeneous deposition of aluminum.

Example 11

The procedure followed is as in Example 3, but uncrosslinked polymethyl methacrylate whose weight-average molecular mass is 1,900,000 and whose particle size is from 24 to 43 μm, obtained by suspension polymerization, is employed as (meth)acrylic polymer beads.

Molded articles obtained from this composition exhibit a surface resistivity of $4.5\times10^6$ Ω/log 10 and a dielectric strength of 5 kV/mm.

Examples 12 and 13

Two compositions are prepared: one, according to the invention (Example 12), contains crosslinked methacrylic polymer beads of Examples 1 to 5; the other, (Example 13, control), does not contain any.

Both compositions include an unsaturated polyester resin (that of Examples 1 to 5), and antishrinkage additive (polyvinyl acetate sold under the name XM 300 by Reichold), tert-butyl peroctoate as catalyst, calcium carbonate as inorganic filler, carbon black (product PF 300 from Vulcan), calcium stearate as mold release agent, glass fibers (13 mm) and cellulose (cotton) fibres.

The quantities of the compositions are shown in Table 5.

Articles were prepared by injection molding from these compositions. The articles meet the requirements of Class A of the motor vehicle sector. The surface quality is perfect.

The articles obtained from the composition according to the invention (Example 12) are uniform in color, indicating a very good dispersion of the carbon black, which is not the case with the compositions of control Example 13.

The articles from both Examples 12 and 13 can be recycled according to the process of document FR-A-2704863. The mechanical and dielectric characteristics are shown in Table 6.

It should be noted that the articles obtained with the control composition (Example 13) have a surface resistivity which is not uniform over the whole surface, as a result of the poor dispersion of the carbon black.

Table 5

TABLE 5

| Nature of the products | Example 12 | Example 13 (control) |
|---|---|---|
| Polyester resin | 27.37% | 27.37% |
| Polymer beads | 6.30% | 0.00% |
| Peroxide catalyst | 0.90% | 0.90% |
| Antishrinkage additive | 17.67% | 23.97% |
| Mold release agent | 3.0% | 3.0% |
| Cellulose (cotton) | 6.2% | 6.2% |
| Inorganic filler | 18.56% | 18.56% |
| Conductive black | 2.0% | 2.0% |
| Glass Fibers | 18.0% | 18.0% |

TABLE 6

| Characteristics | Example 12 | Example 13 (control) |
|---|---|---|
| Density | 1.35 | 1.33 |
| Flexural strength (MPa) | 137 | 140 |
| Flexural modulus (MPa) | 13,200 | 13,000 |
| Impact strength kJ/m$^2$ | 24 | 25 |
| Surface resistivity Ω/log$^{10}$ | $2 \times 10^4$ | $7 \times 10^4$ to $8 \times 10^5$ |
| Dielectric strength kV/mm | 5 | 7 |
| Expansion in % | +0.05 | +0.05 |

Examples 14 and 15 - Compositions for Rocker Covers

Two BMC compositions, the components of which are given in Table 7, are prepared.

In particular, the heat-curable resin is an epoxy vinyl ester resin (Resin 810 from DSM Resins B. V. (The Netherlands)).

The catalyst is tert-butyl peroctoate.

The shrinkage-compensation additives consist of an elastomer sold under the name of XF 300 by the Mastra Company and of polystyrene JA 100 from Elf Atochem S.A.

The inhibitor is hydroquinone in 50% solution in styrene.

Rocker covers are formed from these compositions by molding.

The surface finish of the components is perfect, and the appearance is glossy. The coloration is uniform (homogeneous distribution of the carbon black).

The mechanical and dielectric characteristics are given in Table 8.

The molded components obtained can withstand temperatures of approximately 140° C. continuously, and temperature peaks which may be as high as 200° C.

They have excellent mechanical properties, especially impact strength.

TABLE 7

| Nature of the products | | Examples 14 | 15 |
|---|---|---|---|
| Resin | epoxy vinyl ester | 26.6 | 31.2 |
| Polymer beads | from Example 11 | 5.6 | 7.4 |
| Catalyst | TBPO | 1 | 1 |
| Inorganic fillers | Calcium carbonate | 31.17 | 7.47 |
| Carbon black | PF 300 (Vulcan) | 2 | 2 |
| Antishrinkage additives | elastomer | 4.4 | 5.7 |
| | polystyrene | 1.2 | 2.2 |
| Mold release agent | Calcium stearate | 3 | 3 |
| Polymerization inhibitor | Hydroquinone | 0.03 | 0.03 |
| 13 mm glass fibers | | 25 | 40 |

TABLE 8

| Characteristics | Examples 14 | 15 |
|---|---|---|
| Density | 1.72 | 1.65 |
| Flexural strength (MPa) | 140 | 247 |
| Flexural modulus (MPa) | 12000 | 14700 |
| Impact strength (kJ/m$^2$) | 35 | 65 |
| Surface resistivity (Ω/log 10) | $10^4$ | $10^4$ |
| Dielectric strength (kV/mm) | 8 | 8 |
| Shrinkage (%) | 0.05 | 0.05 |

It may be noted, in particular, that the low resistivity allows paint to be deposited directly by electrostatic gun-spraying.

In the previous examples, the terms "beads" and "prill" are used to generically and specifically describe the makeup of (methacrylic) polymer powder, respectively.

As for the term "ballotini", it refers to glass microspheres commonly used in reflective paint.

The preceding examples can be repeated with similar success by substituting the generically or specifically described reactants and/or operating conditions of this invention for those used in the preceding examples.

The entire disclosure of all applications, patents and publications, cited above and below, and of corresponding French application 95/07900, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

In the specification and in the following claims, the expression "from" in the ranges, e.g., "from 0 . . . ", is meant to include the lower number, e.g., zero; and the expression "up to" is also meant to include zero as the lower value.

What is claimed is:

1. A moldable and pigmentable heat-curable composition for obtaining molded articles having smooth surfaces, a homogeneous distribution of pigments and a zero or practically zero shrinkage or a slight expansion, said composition including, by weight:

(a) from 15 to 45% of an unsaturated polymer or an epoxy vinyl ester, (b) from 0.1 to 1% of a catalyst, (c) from 3 to 15% of (meth)acrylic polymer powder particles having a dimension smaller than 150 $\mu$m, wherein said (meth)acrylic polymer is a homopolymer of methyl methacrylate or a copolymer of methyl metbacrylate with an alkyl acrylate or vinyl monomer, (d) from 3 to 60% of inorganic fillers, (e) from 0 to 5% of organic or inorganic pigments, and (f) up to 60% of reinforcing fibers.

2. A composition in accordance with claim 1, wherein the heat-curable resin is an unsaturated polyester resin prepared from maleic acid, maleic anhydride or fumaric acid and from at least one diol.

3. A composition in accordance with claim 2, wherein the polyester is prepared from additional components of an aromatic, cyclo-aliphatic or saturated aliphatic diacid or anhydride thereof.

4. A composition in accordance with claim 1, in which the (meth)acrylic polymer is a methyl methacrylate homopolymer or a co-polymer of methyl methacrylate and an alkyl acrylate comonomer in which the alkyl group has from 1 to 4 carbon atoms or a vinyl comonomer.

5. A composition in accordance with claim 4, wherein the (meth)acrylic polymer is polymethyl methacrylate having a weight-average molecular mass greater than 100,000.

6. A composition in accordance with claim 1, wherein the powder particles have a dimension of between 10 and 50,$\mu$m.

7. A composition in accordance with claim 1, wherein the catalyst comprises organic peroxide.

8. A composition in accordance with claim 1, wherein the inorganic filler is calcium carbonate or alumina hydrate.

9. A composition in accordance with claim 1, comprising reinforcing fibers selected from the group consisting of glass, carbon and aramid fibers.

10. A composition in accordance with claim 1 comprising from 0.1 to 5% by weight of organic or inorganic pigments.

11. A composition in accordance with claim 10, in which the pigment is selected from the group consisting of a conductive pigment and carbon black.

12. A composition in accordance with claim 1, further comprising an anti-shrinkage agent selected from the group consisting of polystyrene, polyvinyl acetate, elastomers and copolymers of ethylene and of vinyl acetate.

13. A composition in accordance with claim 1, further comprising a mold release agent selected from the group consisting of calcium stearate, zinc stearate and wax.

14. A composition in accordance with claim 1, including, by weight:

from 15 to 35% of a heat-curable resin
from 0.3 to 0.9% of a catalyst
from 35 to 56% of an inorganic filler
from 0.1 to 5% of a pigment
from 7 to 25% of reinforcing fibers
from 4 to 12% of (meth)acrylic polymer powder
from 0 to 12% of an anti-shrinkage agent
from 0.5 to 4% of a mold release agent.

15. A composition in accordance with claim 1, including 0 to 10% by weight of ballotini.

16. A composition in accordance with claim 1, further comprising vegetable and/or synthetic fibers.

17. A composition in accordance with claim 16, including, by weight:

from 15 to 35% of a heat-curable resin
from 0.3 to 0.9% of a catalyst from 3 to 20% of an inorganic filler from 0.1 to 5% of a pigment from 7 to 25% of reinforcing fibers from 4 to 12% of (meth)acrylic polymer powder particles from 0 to 18% of an anti-shrinkage agent from 0.5 to 4% of a mold release agent from 5 to 35% of cellulose fibers.

18. A molded article having zero or practically zero shrinkage or slight expansion obtained from the composition in accordance with claim 1, and including from 1 to 4% by weight of a conductive pigment, exhibiting a surface resistivity of between $10^3$ and $10^7$ Ω/log 10.

19. A molded article having zero or practically zero shrinkage or slight expansion obtained from the composition in accordance with claim 17, and including from 1 to 4% by weight of a conductive pigment, exhibiting a surface resistivity of between $10^3$ and $10^7$ Ω/log 10.

20. A composition according to claim 1, wherein the heat-curable resin is an unsaturated polyester in liquid form diluted in an ethylenically unsaturated monomer selected from the group consisting of styrene, α-methystyrene and vinyltoluene; the catalyst is a liquid; and the composition is obtained by blending solid components of the composition; blending liquid components of the composition; and impregnating the blended solid components with the blended liquid components.

21. A molded article having zero or practically zero shrinkage or slight expansion obtained from the composition in accordance with claim 20, and including from 1 to 4% by weight of a conductive pigment, exhibiting a surface resistivity of between $10^3$ and $10^7$ Ω/log 10.

22. A molded article according to claim 18, having an electrostatically applied coating uniformly and directly deposited thereon, whereby an intermediate conductive primer coat is not required.

23. A molded article according to claim 21, having an electrostatically applied coating uniformly and directly deposited thereon, whereby an intermediate conductive primer coat is not required.

24. A composition in accordance with claim 1, wherein the powder comprises particles having a dimension of less than 10 μm.

25. A composition in accordance with claim 1, wherein the powder comprises particles having a dimension of less than 1 μm.

26. A composition in accordance with claim 1, wherein the powder particles have a dimension of less than 10 μm.

27. A composition in accordance with claim 1, wherein the powder particles have a dimension of less than 1 μm.

* * * * *